United States Patent [19]
Shull

[11] 3,786,954
[45] Jan. 22, 1974

[54] CLOSURE CAP LINER

[75] Inventor: Robert W. Shull, Lancaster, Ohio

[73] Assignee: Anchor Hocking Corporation, Lancaster, Pa.

[22] Filed: Oct. 18, 1971

[21] Appl. No.: 189,901

[52] U.S. Cl. .................... 215/40, 161/42, 161/160
[51] Int. Cl. ............................................. B65d 53/04
[58] Field of Search. 215/40; 161/42, 160; 277/233; 117/138.8 E

[56] References Cited
UNITED STATES PATENTS

| | | | |
|---|---|---|---|
| 3,202,307 | 8/1965 | Rainer | 215/40 X |
| 3,202,308 | 8/1965 | Botkin | 215/40 |
| 3,031,332 | 4/1962 | Rothacker | 117/138.8 E X |
| 3,323,672 | 6/1967 | Acton | 215/40 X |
| 2,389,761 | 11/1945 | Burgeni | 215/40 |
| 3,213,071 | 10/1965 | Campbell | 161/160 UX |

Primary Examiner—Donald F. Norton
Attorney, Agent, or Firm—Norman N. Holland

[57] ABSTRACT

An improved cap liner is disclosed for use with a closure cap in sealing a container. The liner is cut from a foamed polyethylene sheet material. It provides an extremely tight seal for products such as fine powdered products where leakage has been experienced with prior liners. The foamed liner material has improved dynamic cushioning properties so that a tight seal is maintained at all times including handling and shipping operations of the sealed package. One embodiment of the closure is a laminate of the foamed sheet material and a thin air impervious film such as a saran resin film.

5 Claims, 6 Drawing Figures

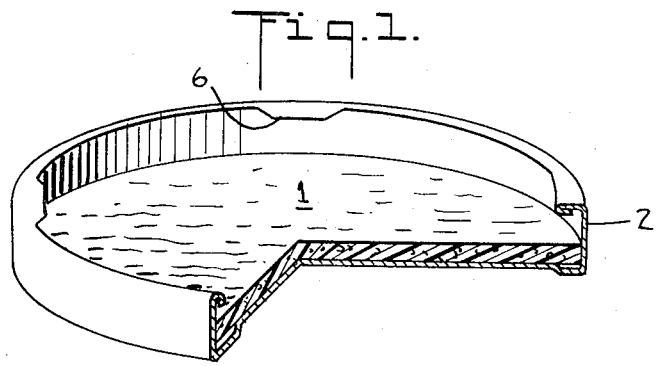
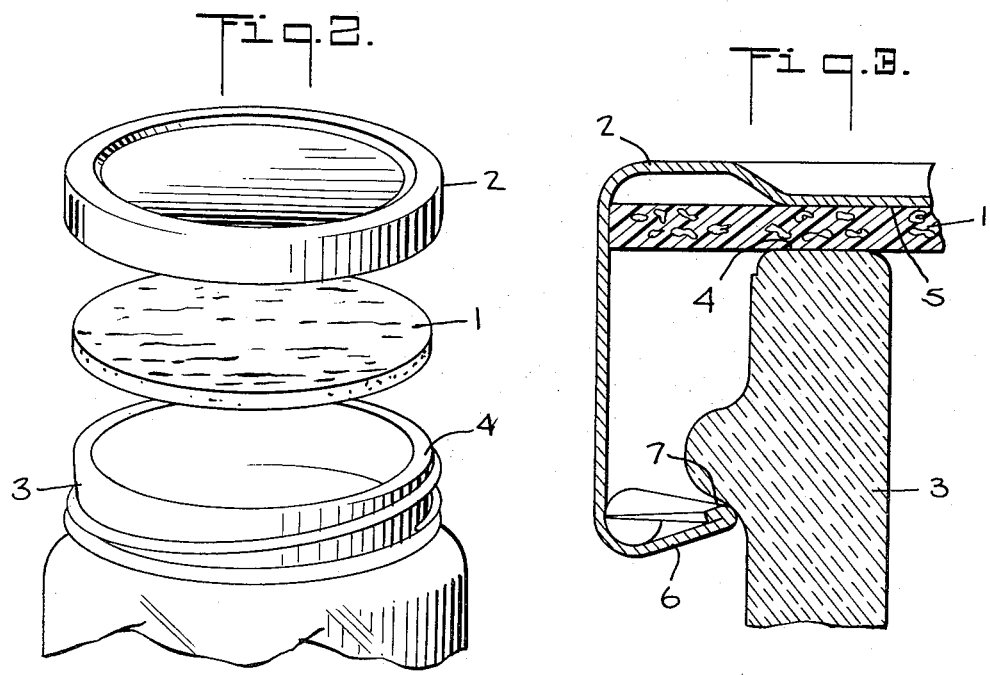
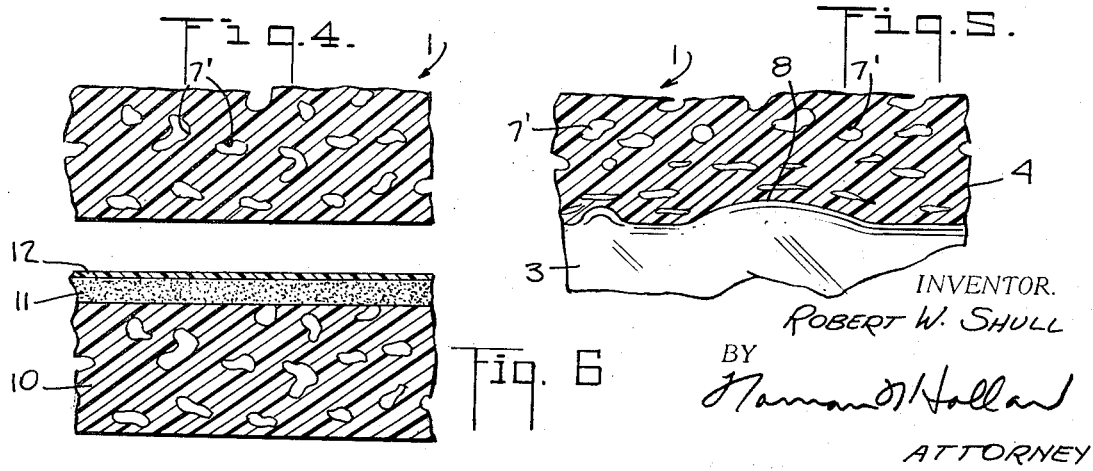

CLOSURE CAP LINER

BACKGROUND OF THE INVENTION

The present invention relates to improvements in package sealing and particularly to an improved sealing liner for use with a closure cap of the type used to seal glass or other container.

Metal and plastic closures have long been used for sealing glass and other containers where liners are included in the closure caps to form a tight seal between the cap shells and the container tops or finishes. A variety of materials have been used for these liners including paper, paperboard, rubber, etc. There is a large and continuing demand for a relatively simple closure for use in volume packaging where the liners are formed and inserted in an inexpensive manner by being cut from a sheet of paperboard or similar material. Such cut liners are used, for example, in enormous volume in packaging many powdered products including food products such as powdered coffee and a variety of other products. In many of these packages, cut paperboard liners have proven quite satisfactory where a relatively good grade of paperboard known as a food grade paperboard has been used. Certain products, however, and particularly very fine powdered products have been found to present a leakage problem when the packages are sealed with the known cut liners and significant amounts of certain products such as powders have been known to sift under the sealing liners during the shipment or other handling of these packages.

The improved liner of the present invention, when cut and inserted into otherwise conventional closure shells, has been found to provide a perfect seal suitable for packaging the finest powders with no loss even during strenuous handling of the sealed packages. Additionally, a laminated embodiment of the improved liner also provides a superior hermetic seal.

As will be more fully described below, the improved liners are cut or otherwise formed from sheets of a foamed plastic material and particularly of a foamed polyethylene material. The laminated form has an air impervious film of saran resin or another inert and impervious film adhered to one surface of the liners.

Accordingly, an object of the present invention is to provide an improved cap liner.

Another object of the present invention is to provide an improved cut cap liner for use with a closure cap in sealing glass or other containers.

Another object of the present invention is to provide an improved cap liner or gasket useful for sealing extremely fine powdered products.

Another object of the present invention is to provide an improved cut liner or gasket having improved dynamic cushioning properties.

Another object of the present invention is to provide an improved closure liner material useful for sealing powdered products including powdered food products and for providing at the same time an excellent hermetic seal.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 1 is a perspective view partially in section illustrating a closure cap including a preferred embodiment of a cap liner in accordance with the present invention.

FIG. 2 is an exploded perspective view illustrating the liner in combination with a typical closure shell and container.

FIG. 3 is an enlarged vertical sectional view illustrating the liner employed with a typical closure cap for sealing a container.

FIG. 4 is a greatly enlarged fragmentary sectional view of the closure material of the invention illustrating its foamed characteristic.

FIG. 5 is a greatly enlarged sectional view illustrating the liner material in engagement with a container finish.

FIG. 6 is an enlarged sectional view of a laminated embodiment of the liner.

DESCRIPTION OF THE PREFERRED EMBODIMENT

FIGS. 1 through 3 illustrate a gasket 1 in accordance with the invention cut from the improved gasket material. The gasket 1 is shown in position in a suitable metal cap shell 2 of a type particularly suited for sealing a container 3 when used with the improved liner material. It is clear, however, that the advantages of the improved material may also be realized with cap shells formed with differing shapes and of other materials, including plastic. The gaskets 1 are seen to be cut to fit snugly within the metal cap shell 2 in position to form a seal between the upper portion of the glass container 3 finish 4 and the underside 5 of the cap shell 2.

The cap shell 2 whose preferred form and general proportions are illustrated in FIG. 3 is particularly useful in combination with a liner of the type described herein. As seen in FIG. 3, the cut liner 1 is relatively thick and a tight seal between the closure shell 2 and the container 3 is obtained by the flexing properties of a relatively deep cap lug 6 with a tightly curled inner edge 7 of the form shown. Such a cap shell form is described, for example, in U.S. Pat. No. 3,323,672 dated June 6, 1967 issued to Daniel D. Acton and owned by the assignee of the present invention.

The improved liner material is a polyethylene foam sheet material. One preferred form is designated as "Haskon Minicell H-600" furnished by Hercules Inc. of Wilmington, Delaware. This material is an expanded or foamed or cellular sheet product formed by extruding polyethylene in strips of an indeterminate length with a blowing agent included which forms the cellular sheet structure having isolated cells 7' as illustrated in exaggerated form in FIGS. 4 and 5. Such material has excellent tensile strength and will not absorb water or other liquids normally encountered in food packaging operations. In addition, the foamed polyethylene sheet material has been found to have unexpectedly good dynamic cushioning properties. This results in a cut liner 1 where the cellular nature of the material permits it to form a tight seal on the container finish even where significant irregularities such as a rib 8 may be present on the container 3 sealing surface 4 as illustrated in FIG.

5. Additionally, the dynamic cushioning properties of this material permit the liner seal to remain effective even when the package is subjected to jolting and jarring during handling including shipment.

The material has also been found to have excellent thermal stability which is important particularly in connection with the packaging of powdered food materials and certain other powdered products including powdered graphite or toner and where the packages may be subjected to high temperatures in the ambient atmosphere normally encountered where such powders may be stored. The dynamic cushioning properties have been found to have unexpectedly high values in package liner usage resulting from the high resiliency of this material where a typical foam sheet might have a 42 percent rebound Bashore. These properties together with the low absorption, the high tensile strength, and high compressive strength cooperate to provide the improved package liner characteristics. The material is also particularly applicable to the above noted food package uses since such a polyethylene material has obtained FDA approval.

FIG. 6 illustrates another embodiment which has a greater resistance to air penetration through the addition of a thin air impervious film 12 which is adhered by an adhesive 11 to the thicker foam polyethylene layer 10. The layer 10 is preferably of the foam polyethylene material already described as, for example, a three thirty-seconds inch foam polyethylene sheet material.

The air barrier layer or film 12 is a tough, chemically resistant, odorless, flexible, air and moisture impermeable material with sufficient flexibility to permit the foam layer to form the above described tight seal with a container rim.

A preferred film 12 has a thickness of about 0.0002 inches and may be attached to the polyethylene foam layer 10 with a 0.001 inch thick low density polyethylene bond 11. One suitable film is a saran thermoplastic resin of the type produced by the polymerization of vinylidene chloride with smaller amounts of vinyl chloride. The Dow Chemical Co. of Midland, Michigan, supplies suitable saran vinylidene chloride-vinyl chloride copolymers (90–10 to 85–15) as flexible foils or films.

Liners of the foam with the thin air and moisture sealing films are useful, for example, in packaging food products such as mayonnaise, salad dressing, and spices in closure sealed glass containers.

It will be seen that an improved liner and liner material have been provided which are of particular use in difficult sealing operations, such as may be encountered in packaging relatively fine powdered products. A liner is provided with excellent dynamic cushioning properties and which also has high tensile and compressive strength values and which is inert with respect to the products for which it is particularly useful. The laminated embodiment with a protective film layer is of particular value for packaging products which may be air or moisture sensitive.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A laminated gasket for forming a seal between a closure cap and a container comprising the combination of a relatively thick cellular polyethylene layer, and a relatively thin flexible air and moisture impervious saran resin layer adhered to said polyethylene by a low density polyethylene bond.

2. The gasket as claimed in claim 1 in which said polyethylene has a relatively high density.

3. The gasket as claimed in claim 2 in which said density is about 6 pounds per cubic feet.

4. The gasket as claimed in claim 2 in which said polyethylene has a Bashore percent rebound of about 42 providing dynamic liner cushioning properties.

5. The gasket as claimed in claim 1 in which said cellular layer is about 0.1 inch in thickness and said thin layer is about 0.0002 inches thick.

* * * * *